US010489329B2

(12) United States Patent
Uchida

(10) Patent No.: US 10,489,329 B2
(45) Date of Patent: Nov. 26, 2019

(54) COMPUTER MOUNTING MULTIPLE MODULES FACILITATING OPENING/EXPANSION CONTROL PROCESS WITH CONNECTORS

(71) Applicant: NEC Corporation, Tokyo (JP)

(72) Inventor: Kazuya Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 249 days.

(21) Appl. No.: 15/077,357

(22) Filed: Mar. 22, 2016

(65) Prior Publication Data
US 2016/0292114 A1  Oct. 6, 2016

(30) Foreign Application Priority Data

Mar. 30, 2015 (JP) .................................. 2015-068247

(51) Int. Cl.
G06F 13/40 (2006.01)

(52) U.S. Cl.
CPC ...... G06F 13/4022 (2013.01); G06F 13/4027 (2013.01)

(58) Field of Classification Search
None
See application file for complete search history.

(56) References Cited

U.S. PATENT DOCUMENTS

| 6,025,924 A * | 2/2000 | Miura | G06F 3/1293 358/1.13 |
| 6,141,769 A * | 10/2000 | Petivan | G06F 11/165 714/10 |
| 6,484,215 B1 * | 11/2002 | Gibart | G05B 19/054 710/3 |
| 6,612,021 B1 * | 9/2003 | Taniguchi | G01R 1/073 29/712 |

(Continued)

FOREIGN PATENT DOCUMENTS

| CN | 101446935 A | 6/2009 |
| JP | 7-225640 | 8/1995 |

(Continued)

OTHER PUBLICATIONS

Japanese Office Action dated Apr. 26, 2016, by the Japanese Patent Office in counterpart Japanese Patent Application No. 2015-068247.

(Continued)

*Primary Examiner* — Michael Sun
(74) *Attorney, Agent, or Firm* — Finnegan, Henderson, Farabow, Garrett & Dunner, L.L.P.

(57) ABSTRACT

A computer includes a first module, a second module controlled by the first module, a first connector connectable to the first module, a second connector connectable to either the first module or the second module, and a data transmission line configured to connect the first connector to the second connector. The first module includes a switch configured to electrically connect the data transmission line to the first module attached to the first connector. The switch (Continued)

breaks an electrical connection between the data transmission line and the first module attached to the second connector. Thus, it is possible to improve expandability in the computer acting as a server. Additionally, it is possible to prevent complexity of design and increased cost in manufacturing servers.

3 Claims, 7 Drawing Sheets

(56) References Cited

U.S. PATENT DOCUMENTS

| | | | | |
|---|---|---|---|---|
| 9,361,046 | B1* | 6/2016 | Martin | G06F 3/0686 |
| 9,673,623 | B2* | 6/2017 | Binder | A63F 9/24 |
| 2003/0067744 | A1* | 4/2003 | Pappalardo | G06F 1/1626 |
| | | | | 361/679.41 |
| 2009/0204742 | A1* | 8/2009 | Wiler | G06F 3/023 |
| | | | | 710/316 |
| 2009/0213544 | A1* | 8/2009 | Dittus | H05K 7/20727 |
| | | | | 361/695 |
| 2014/0059280 | A1* | 2/2014 | Im | G06F 3/0688 |
| | | | | 711/103 |
| 2014/0068286 | A1* | 3/2014 | Nguyen | G06F 1/181 |
| | | | | 713/300 |
| 2015/0109026 | A1* | 4/2015 | Lin | G06F 13/385 |
| | | | | 326/80 |
| 2016/0104972 | A1* | 4/2016 | Feng | H01R 13/6581 |
| | | | | 439/607.27 |
| 2016/0353603 | A1* | 12/2016 | Jau | H05K 7/1491 |
| 2017/0054835 | A1* | 2/2017 | Gadi | H04M 1/0277 |
| 2017/0149241 | A1* | 5/2017 | Binder | A63F 9/24 |

FOREIGN PATENT DOCUMENTS

| | | |
|---|---|---|
| JP | 2004-30315 | 1/2004 |
| JP | 2004-206462 | 7/2004 |
| JP | 2009-187172 | 8/2009 |
| JP | 2012-22463 | 2/2012 |

OTHER PUBLICATIONS

Notification of First Office Action issued by the Chinese Patent Office dated Jul. 3, 2019 in counterpart Chinese Patent Application No. 201610184516.5.

* cited by examiner

COMPUTER MOUNTING MULTIPLE MODULES FACILITATING OPENING/EXPANSION CONTROL PROCESS WITH CONNECTORS

TECHNICAL FIELD

The present invention relates to a computer mounting multiple modules which facilitate opening/expansion control processes with connectors.

The present application claims priority on Japanese Patent Application No. 2015-68247, the content of which is incorporated herein by reference.

BACKGROUND ART

Computers each mounting multiple modules in a single chassis may include different types of slots such as a slot connectable to a CPU module, a slot connectable to a storage module, and a slot connectable to an I/O module.

Patent Literature Document 1 discloses a server including a CPU-module connector connectable to a CPU module, an IO-module connector connectable to an IO module, and a CPU/IO-module combined connector selectively connectable to either a CPU module or an IO module. Herein, the CPU/IO-module combined connector is designed to unify a CPU-module connector and an IO-module connector; hence, it includes two sockets individually receiving a CPU module and an IO module.

CITATION LIST

Patent Literature Document

Patent Literature Document 1: Japanese Patent Application Publication No. 2009-187172

SUMMARY OF INVENTION

Technical Problem

A computer such as a micro server including a plurality of slots is designed to mount a CPU module and an expansion module according to a client's specification. The server of Patent Literature Document 1 including a plurality of slots dedicated to various types of modules needs to be changed in design according to a client's specification; hence, it may need a complex design which in turn increases manufacturing cost.

The present invention aims to improve expandability while preventing complexity of design and increased manufacturing cost with a computer such as a high-density server mounting multiple modules which facilitate opening/expansion control processes with connectors.

Solution to Problem

In a first aspect of the present invention, a computer includes a first module, a second module controlled by the first module, a first connector connectable to the first module, a second connector connectable to either the first module or the second module, and a data transmission line configured to connect the first connector to the second connector. The first module includes a switch configured to electrically connect the data transmission line to the first module attached to the first connector. The switch breaks an electrical connection between the data transmission line and the first module attached to the second connector.

In a second aspect of the present invention, a server includes the computer in which the first module includes a control unit while the second module includes an expansion unit configured to expand the function of the control unit.

In a third aspect of the present invention, a module is connectable to either a first connector including a first electrode connectable to a first end of a data transmission line or a second connector including a second electrode connectable to a second end of a data transmission line. The module includes a switch which secures an electrical connection with the first electrode of the first connector but breaks an electrical connection with the second electrode of the second connector.

In a fourth aspect of the present invention, a connector set is detachably connectable to a first module and a second module controlled by the first module. The connector set includes a first connector connectable to the first module, a second connector connectable to either the first module or the second module, and a data transmission line configured to connect the first connector to the second connector. The second connector includes an identification device configured to identify that the first module is attached to the second connector.

In a fifth aspect of the present invention, an assembling method adapted to the computer includes a first step of attaching the first module to the first connector and a second step of attaching either the first module or the second module to the second connector.

In a sixth aspect of the present invention, a control method adapted to the computer includes a determination process configured to determine whether or not the first module recognizes the second module, an expansion control process configured to allow the first module to control the second module when the determination process indicates that the first module recognizes the second module, and an independent operation process configured to allow the first module to independently operate when the determination process indicates that the first module does not recognize the second module.

In a seventh aspect of the present invention, an opening control program adapted to the computer causes the first module to implement the determination process, the expansion control process, and the independent operation process.

Advantageous Effects of Invention

According to the present invention, it is possible to improve expandability in the computer acting as a server. Additionally, it is possible to prevent complexity of design and increased cost in manufacturing servers.

DESCRIPTION OF EMBODIMENTS

The present invention will be described in detail by way of examples with reference to the accompanying drawings.

Figure 1:
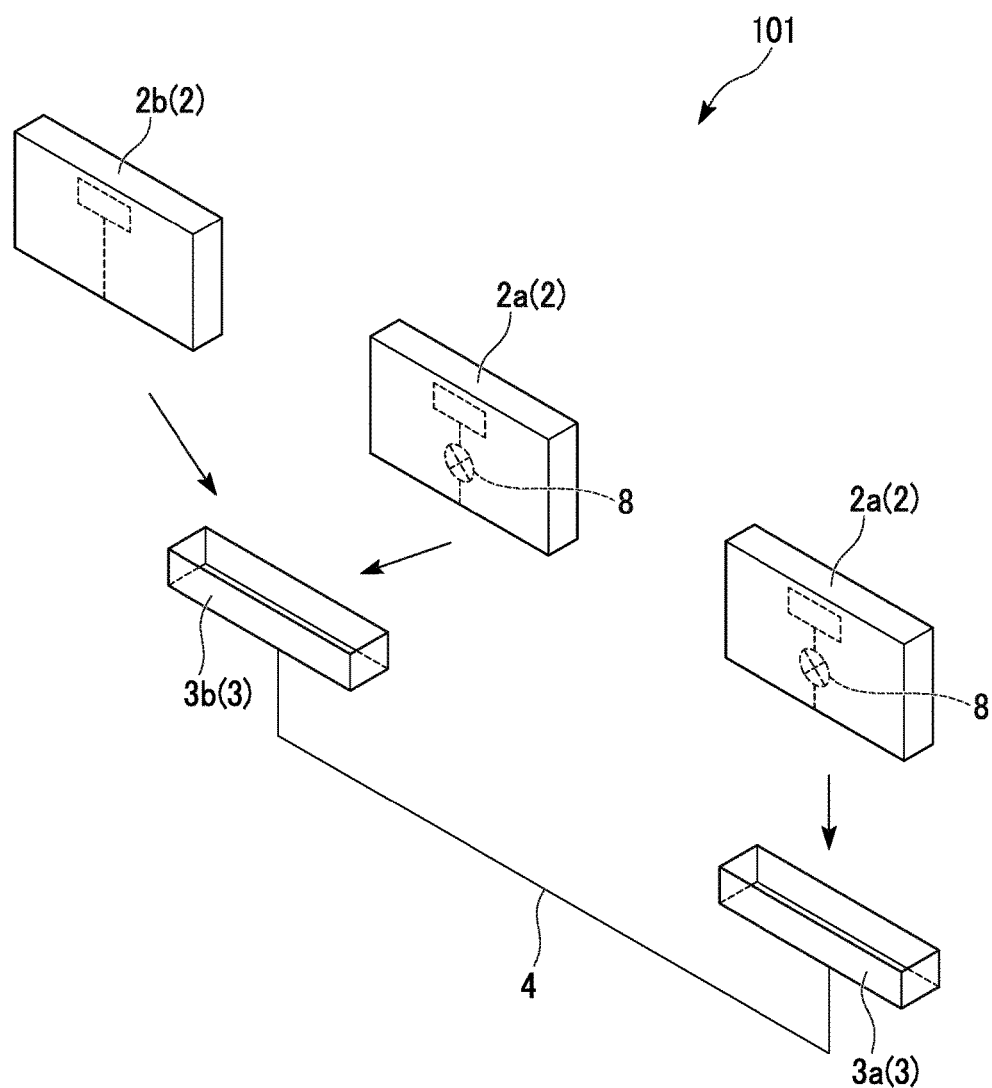
FIG. 1 is a perspective view of a computer according to the first embodiment of the present invention.

FIG. 1 is a perspective view of a computer 101 according to the first embodiment of the present invention. The computer 101 includes modules 2, connectors 3, and a data transmission line 4. For example, the computer 101 is applicable to a hybrid high-density server mounting a plurality of server units.

The modules 2 install hardware elements and software elements implementing various functions. The computer 101 includes at least two types of modules 2 having different functions such as a first module 2a and a second module 2b. For example, the first module 2a includes a CPU (Central Processing Unit) executing calculations and control processes. The second module 2b is controlled by the first module 2a. The second module 2b is an expansion module configured to expand the function of the first module 2a. For example, the second module 2b is an expansion module having a network interface. The first and second modules 2a, 2b are connectable to the connectors 3.

The computer 101 includes two types of connectors 3 such as a first connector 3a and a second connector 3b. The first module 2a is attached to the first connector 3a while either the first module 2a or the second module 2b is selectively attached to the second connector 3b. According to operation, the computer 101 prevents the second module 2a from being attached to the first connector 3a. Similar to the second connector 3b, however, the first connector 3a is formed in a shape detachably connectable to the first and second modules 2a, 2b.

The data transmission line 4 is connected between the first and second connectors 3a, 3b. The data transmission line 4 enables data transmission between the first and second connectors 3a, 3b. For example, the data transmission line 4 is standardized under the "PCI Express (Peripheral Components Interconnect Express)". The first embodiment employs a connector set including the first and second connectors 3a, 3b and the data transmission line 4.

The first module 2a includes a switch 8 configured to change the electrically connected/disconnected condition with the connector 3. In contrast, the second module 2b does not include the switch 8. The switch 8 is embedded inside the first module 2a. It is possible to locate the switch 8 at the intermediate position of wiring connected between an internal circuit (e.g. a control unit) of the first module 2a and the connector 3.

When the first module 2a is attached to the first connector 3a, the switch 8 electrically connects the first module 2a to the first connector 3a, in other words, the switch 8 electrically connects the first module 2a to the data transmission line 4. That is, the switch 8 serving as a normally-open-type switch is turned on when the first module 2a is attached to the first connector 3a, and therefore the first module 2a is electrically connected to the first connector 3a. For example, the switch 8 employs a semiconductor switch such as an analog switch. The position of the switch 8 is not necessarily limited to the inside of the first module 2a.

When the first module 2a is attached to the second connector 3b, the switch breaks the electrical connection between the first module 2a and the second connector 3b, in other words, the electrical connection between the first module 2a and the data transmission line 4. That is, when the first module 2a is attached to the second connector 3b, the switch 8 holds the OFF condition to electrically disconnect the first module 2a from the second connector 3b.

For example, the ON/OFF condition of the switch 8 is controlled using a fixed potential applied to the first connector 3a; hence, it is possible to turn off the switch 8 based on the fixed potential of the first connector 3a. Alternatively, it is possible to provide an operation part (not shown) which allows a user to manually operate the switch 8. That is, it is possible for a user to operate the switch 8 in the ON condition when the first module 2a is attached to the second connector 3b. The first embodiment employs a normally-open-type switch as the switch 8; but this is not a restriction. For example, the switch 8 may employ a normally-closed-type switch. In this case, when the first module 2a is attached to the second connector 3b, the switch 8 is turned off so as to electrically disconnect the first module 2a from the second connector 3b.

Figure 2:
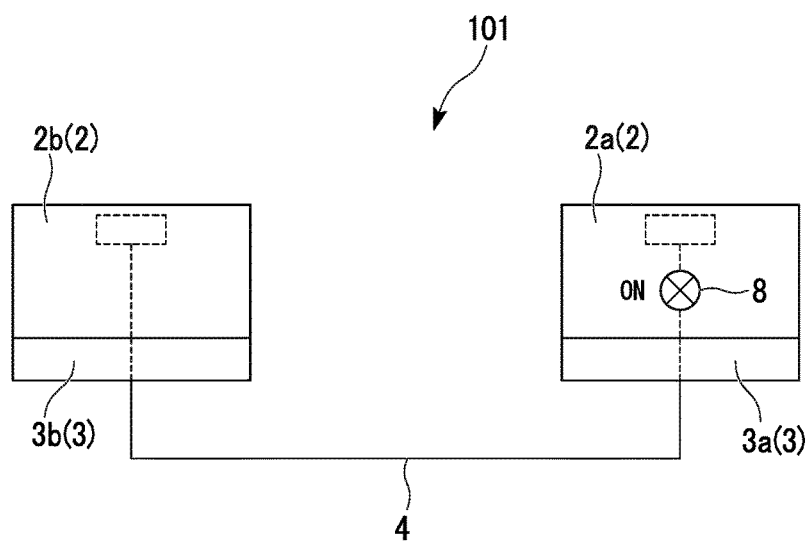
FIG. 2 is a schematic diagram showing that a pair of first and second modules is attached to a pair of first and second connectors connected together through a data transmission line in the computer of the first embodiment.
Figure 3:
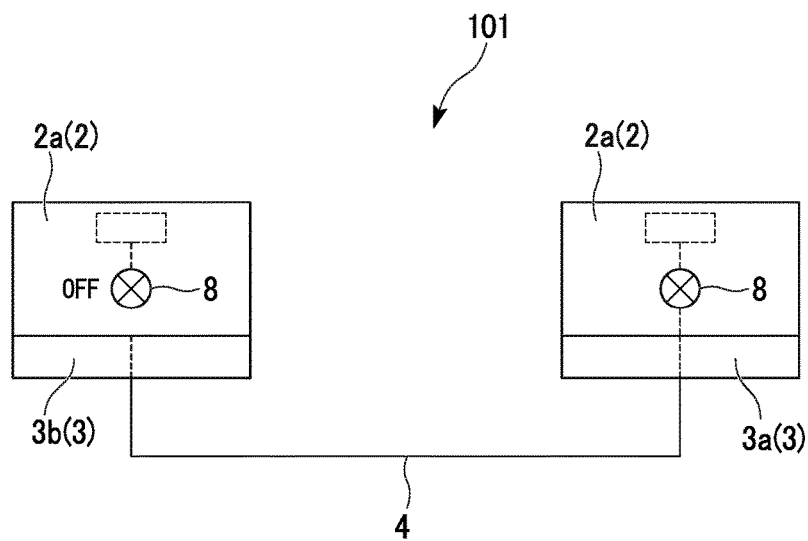
FIG. 3 is a schematic diagram showing that a pair of first modules is attached to a pair of first and second connectors connected together through a data transmission line in the computer of the first embodiment.

FIG. 2 shows the computer 101 in which the first module 2a is attached to the first connector 3a while the second module 2b is attached to the second connector 3b. FIG. 3 shows the computer 101 in which a pair of first modules 2a is attached to the first and second connectors 3a, 3b.

In the computer 101 of FIG. 2 in which the first module 2a is attached to the first connector 3a while the second module 2b is attached to the second connector 3b, it is possible to connect the first module 2a to the second module 2b through the data transmission line 4, thus carrying out data transmission. This makes it possible for the first module 2a to control the second module 2b.

In the computer 101 of FIG. 3 in which a pair of first modules 2a is attached to the first and second connectors 3a, 3b, the first module 2a is not electrically connected to the second connector 3b. For this reason, it is possible to independently operate the first modules 2a without implementing any identification between the first modules 2a.

As a result, the first embodiment eliminates the necessity of arranging different types of connectors dedicated to the first and second modules 2a, 2b. For this reason, it is possible to prevent complexity of design due to any design change according to a client's specification. Additionally, it is possible for the first module 2a attached to the first connector 3a to discriminate the type of the module 2 attached to the second connector 3b with a simple configuration; hence, it is possible to prevent increased cost.

Additionally, the first embodiment shares the same type of connectors 3 as used in the first and second connectors 3a, 3b; hence, it is possible to prevent an increased number of parts. Moreover, the second module 2b does not need the switch 8; hence, it is possible to prevent an increased number of parts.

Figure 4:
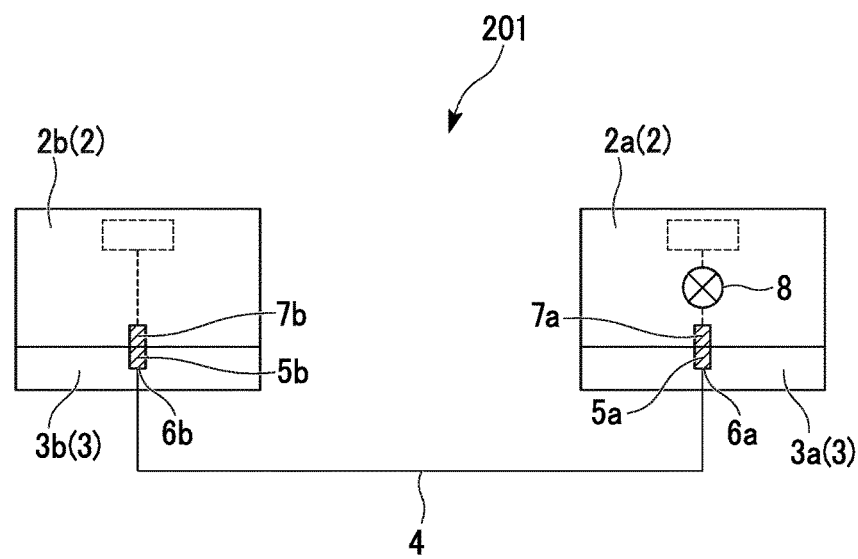
FIG. 4 is a schematic diagram of a computer according to the second embodiment of the present invention in which a pair of first and second modules is attached to a pair of first and second connectors connected together through a data transmission line.
Figure 5:
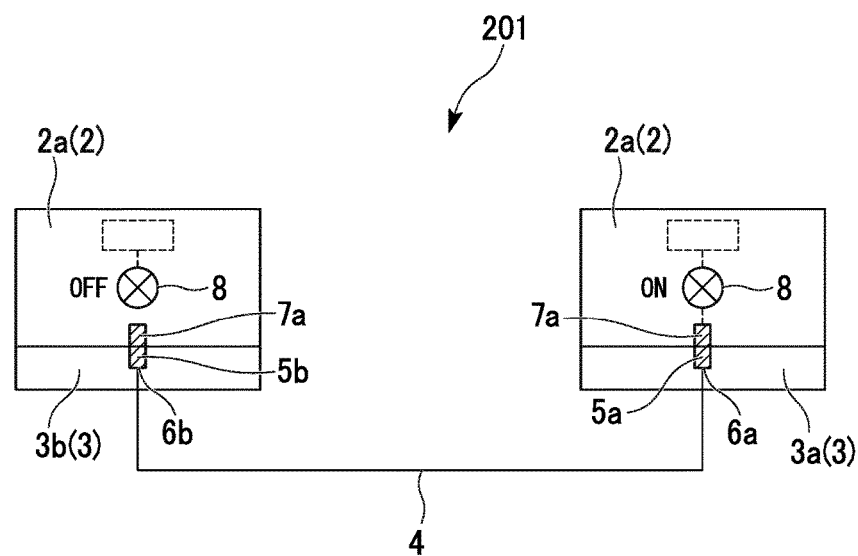
FIG. 5 is a schematic diagram of the computer of the second embodiment in which a pair of first modules is attached to a pair of first and second connectors connected together through a data transmission line.

Next, the second embodiment of the present invention will be described in detail with reference to FIGS. 4 and 5, in which parts identical to the foregoing parts of the first embodiment are denoted using the same reference signs; hence, duplicate descriptions will be omitted. FIGS. 4 and 5 show a computer 201 according to the second embodiment of the present invention in a different configuration. Similar to FIG. 2, FIG. 4 shows the computer 201 in which the first module 2a is attached to the first connector 3a while the second module 2b is attached to the second connector 3b. Similar to FIG. 3, FIG. 5 shows the computer 201 in which a pair of first modules 2a is attached to the first and second connectors 3a, 3b. The computer 201 of FIG. 4 includes the first and second modules 2a, 2b, the first and second connectors 3a, 3b, and the data transmission line 4 configured to connect the first and second connectors 3a, 3b. Similar to the computer 101 of the first embodiment, the computer 201 of the second embodiment is applicable to a hybrid high-density server mounting a plurality of server units.

The first connector 3a includes a first electrode 5a connectable a first end 6a of the data transmission line 4. The first electrode 5a is electrically connected to the first module 2a attached to the first connector 3a. The second connector 3b includes a second electrode 5b connectable to a second end 6b of the data transmission line 4. The second electrode 5b is electrically connected to the second module 2b attached to the second connector 3b.

The first electrode 5a of the first connector 3a is located at the same position as the second electrode 5b of the second connector 3b. In other words, both the first and second connectors 3a, 3b have the same attachment structure accommodating the modules 2. FIG. 4 shows the first and second electrodes 5a, 5b each serving as a single unit; however, each of the first and second electrodes 5a, 5b preferably includes a plurality of electrodes in correspondence with the data transmission line 4 according to the "PCI Express" standard.

The first module 2a includes an electrode 7a configured to carry out data transmission with the second module 2b while the second module 2b includes an electrode 7b configured to carry out data transmission with the first module 2a. The electrode 7a is connected to the first electrode 5a when the first module 2a is attached to the first connector 3a. Alternatively, the electrode 7a is connected to the second electrode 5b when the first module 2a is attached to the second connector 3b. Additionally, the electrode 7b is connected to the second electrode 5b when the second module 2b is attached to the second connector 3b.

The first module 2a includes the switch 8 configured to change the electrically connected/disconnected condition with the connector 3, but the second module 2b does not include the switch 8. The second embodiment employs the same configuration of the switch 8 as the first embodiment. The switch 8 embedded inside the first module 2a is located at the intermediate position of wiring connected between the electrode 7a and an internal circuit such as a control unit (not shown) of the first module 2a. That is, the switch 8 is configured to turn on or off the electrical connection between the electrode 7a and the internal circuit of the first module 2a. In the second embodiment, the second electrode 5b of the second connector 3b comes in contact with the electrode 7a of the first module 2a when the first module 2a is attached to the second connector 3b; hence, an electrical conduction is established between the electrodes 5b and 7a. Substantially, however, the first module 2a will not be electrically connected to the second connector 3b since an electric conduction is not established between the electrode 7a and the internal circuit of the first module 2a.

Similar to the first embodiment, the second embodiment does not need different types of connectors dedicated to the first and second modules 2a, 2b. For this reason, it is possible to prevent complexity of design due to any design change according to a client's specification. Additionally, it is possible for the first module 2a attached to the first connector 3a to discriminate the type of the module 2 attached to the second connector 3b with a simple configuration; hence, it is possible to prevent increased cost. Moreover, it is possible to prevent an increased number of parts since the first and second connectors 3a, 3b share the same shape of the connector 3. It is possible to prevent an increased number of parts since the second module 2b does not need the switch 8.

Figure 6:
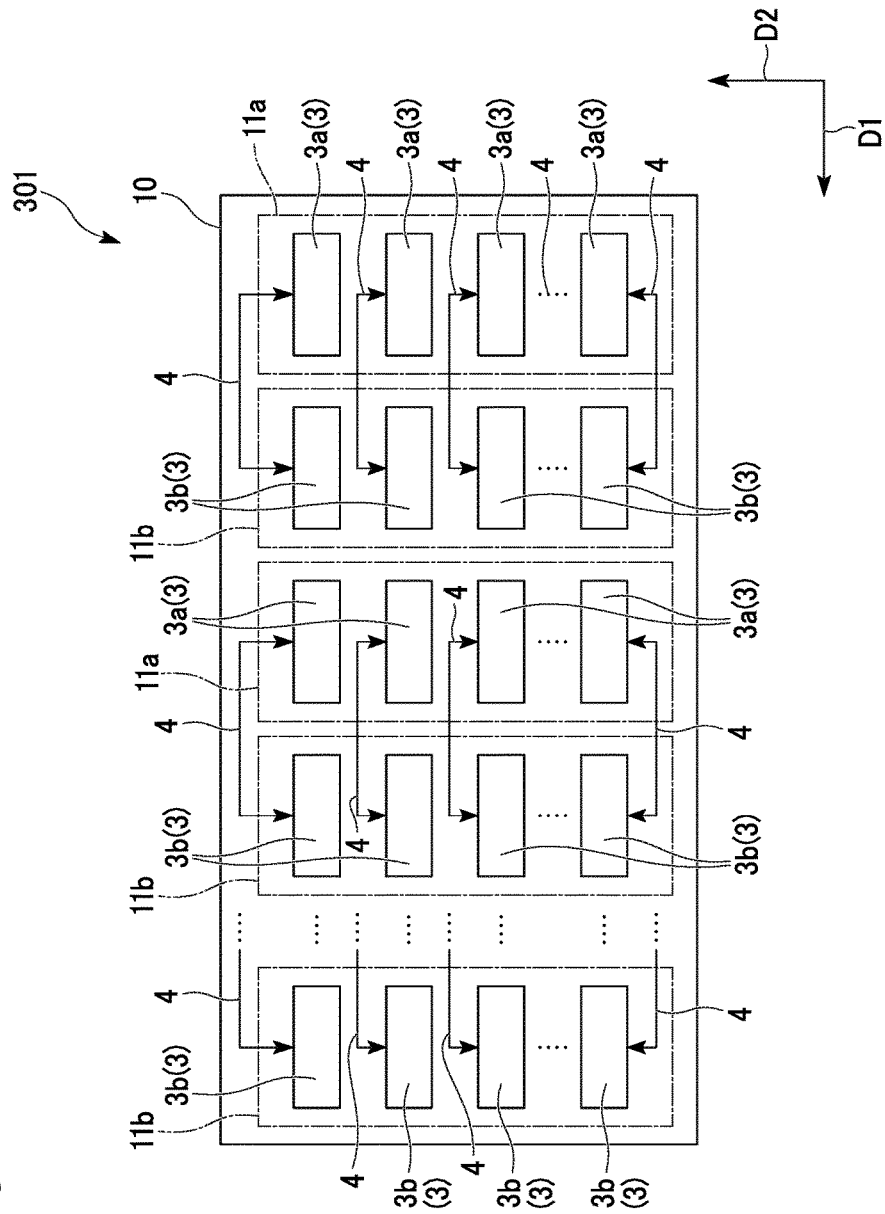
FIG. 6 is a plan view of a computer according to the third embodiment of the present invention.

Next, the third embodiment of the present invention will be described in detail with reference to FIG. 6. The third embodiment differs from the first embodiment in that a plurality of connectors is arranged in a matrix defined by rows and columns on a substrate. In FIG. 6, parts identical to the foregoing parts of the first embodiment are denoted using the same reference signs; hence, duplicate descriptions will be omitted. FIG. 6 is a plan view of a computer 301 according to the third embodiment of the present invention. The computer 301 includes the modules 2 (not shown), the connectors 3, the data transmission lines 4, and a substrate 10.

A plurality of connectors 3 is fixed onto the substrate 10. The connectors 3 are aligned in first and second directions D1, D2 perpendicular to each other (see arrows in FIG. 6). The third embodiment refers to the first and second directions D1, D2, which are perpendicular to each other; but this is not a restriction. Additionally, FIG. 6 shows different numbers of connectors 3 aligned in the first and second directions D1, D2; but the present embodiment is not necessarily limited in terms of the numbers of connectors 3 shown in FIG. 6.

Similar to the first and second embodiments, the third embodiment employs two types of connectors 3, i.e. the first connectors 3a and the second connectors 3b. A plurality of first connectors 3a is aligned in an odd-number column 11a (e.g. an N column) while a plurality of second connectors 3b is aligned in an even-number column 11b (e.g. a N+1 column). The first connectors 3a of the odd-number column 11a adjoin the second connectors 3b of the even-number column 11b in the first direction D1. Herein, each pair of the first and second connectors 3a, 3b adjoining each other in the first direction D1 is connected together through the data transmission line 4.

The substrate 10 is a printed circuit board (PCB). The substrate 10 is enclosed in a chassis (not shown). A plurality of data transmission lines 4 is formed on the substrate 10. For example, the substrate 10 may employ a multi-layered printed circuit board. The third embodiment utilizes the first and second modules 2a, 2b such that the first module 2a is attached to the first connector 3a of the odd-number column 11a while the second module 2b is attached to the second connector 3b of the even-number column 11b which adjoins the first connector 11a in the first direction D1.

Thus, it is possible for the first module 2a to control the second module 2b through the data transmission line 4 formed on the substrate 10. In this connection, it is possible to solely operate the first module 2a without being connected to the second module 2b when the first module 2a is connected to any one of the connectors 3. For this reason, it is possible for an operator to easily understand the connected condition between the first and second modules 2a, 2b in the first direction D1 even when a plurality of connectors 3 is aligned on the substrate 10.

The third embodiment aligns a plurality of connectors 3 with their longitudinal directions which match the first direction D1 in FIG. 6. Thus, it is possible for an operator to easily understand the first direction D1 based on the longitudinal direction of each connector 3. In the computer 301 of the third embodiment, the longitudinal direction of each connector 3 matches the first direction D1; but this is not a restriction. For example, it is possible to modify the computer 301 such that the crosswise direction (or the short-side direction) of each connector 3 matches the first direction D1. In this modification, it is possible to connect the first and second connectors 3a, 3b with the shortest distance. This modification is advantageous due to a reduced wiring impedance of the data transmission line 4.

Figure 7:
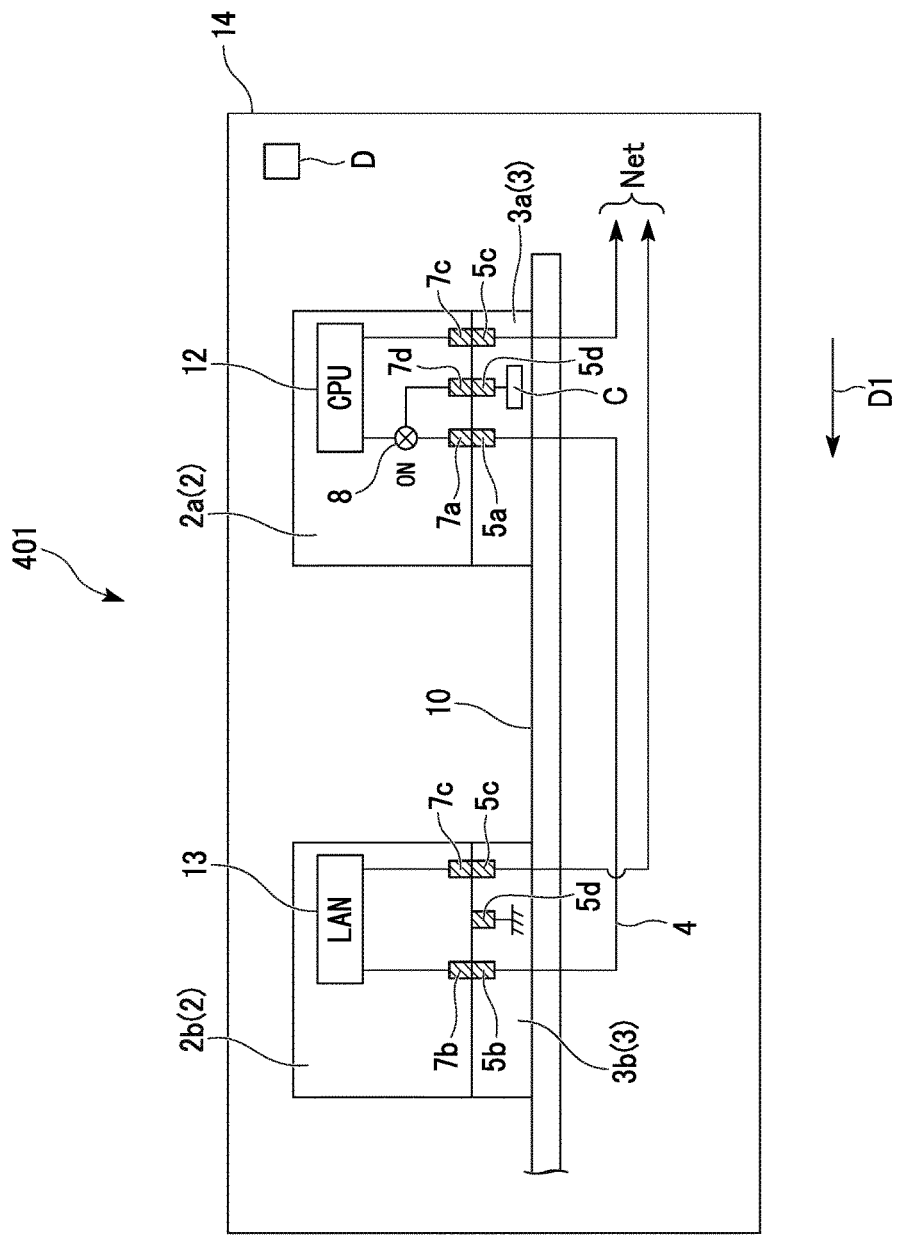
FIG. 7 is a schematic diagram of a computer according to the fourth embodiment of the present invention in which a pair of first and second modules is attached to a pair of first and second connectors connected together through a data transmission line.
Figure 8:
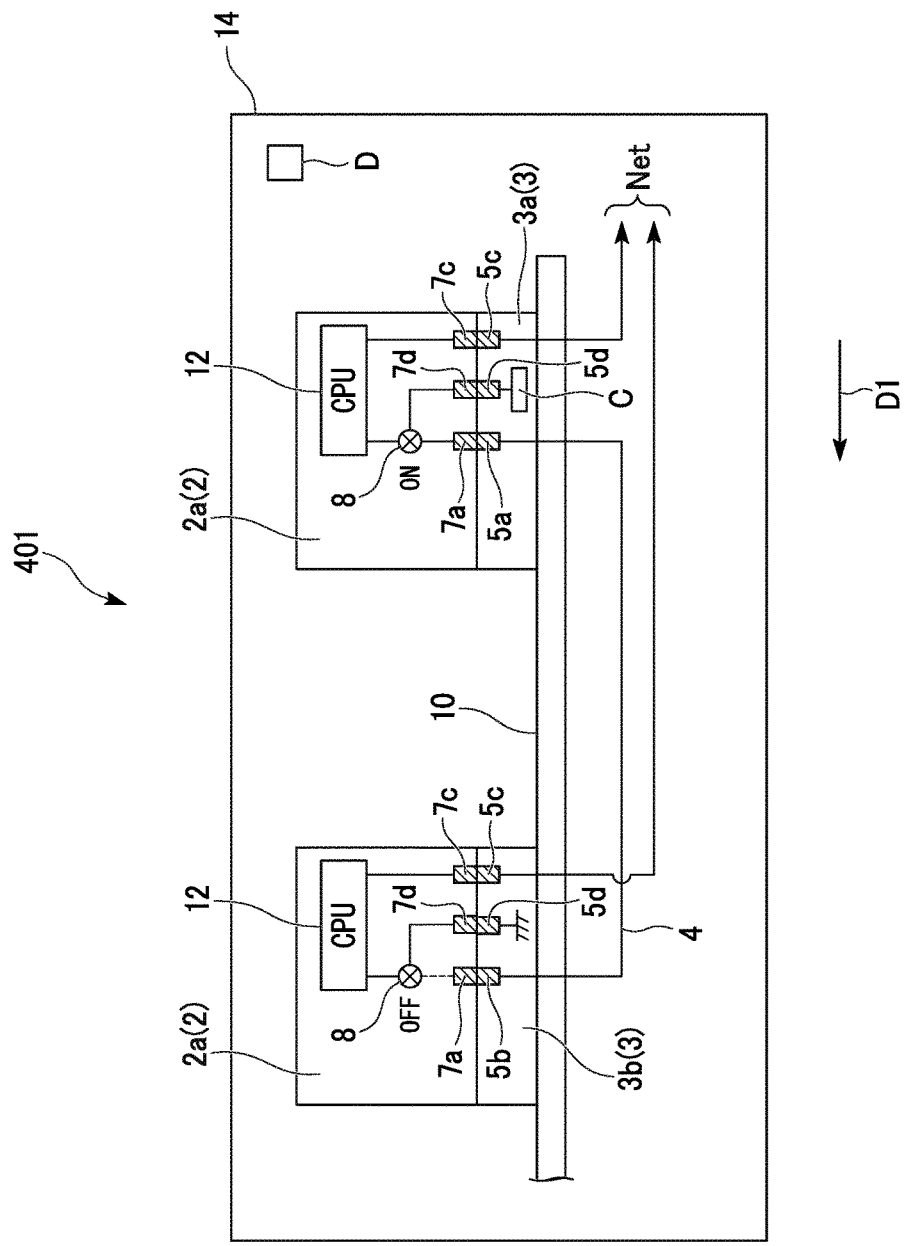
FIG. 8 is a schematic diagram of the computer of the fourth embodiment in which a pair of first modules is attached to a pair of first and second connectors connected together through a data transmission line.

Next, the fourth embodiment of the present invention will be described in detail with reference to FIGS. 7 to 10. The fourth embodiment is applicable to a high-density server mounting a plurality of server units. In FIGS. 7 and 8, parts identical to the parts of the foregoing embodiments shown in FIGS. 1 to 5 are denoted using the same reference signs; hence, duplicate descriptions will be omitted. The fourth embodiment refers to one connector set among a plurality of connector sets. FIGS. 7 and 8 show a computer 401 according to the fourth embodiment of the present invention in a different configuration. The computer 401 of FIG. 7 is similar to the computers 101 and 201 shown in FIGS. 2 and 4 while the computer of FIG. 8 is similar to the computers 101 and 201 shown in FIGS. 3 and 5.

The computer 401 of FIG. 7 includes the first and second modules 2a, 2b, the first and second connectors 3a, 3b, the data transmission line 4, the substrate 10, and a chassis 14. The first module 2a includes a control unit (e.g. a CPU) 12 while the second module 2b includes an expansion unit (e.g. a LAN) 13. The second module 2b expands the communication function of the first module 2a.

The control unit 12 of the first module 2a is electrically connected to the first electrode 5a of the first connector 3a when the first module 2a is attached to the first connector 3a disposed at the N column. In FIG. 8, however, the control unit 12 of the first module 2a is not electrically connected to the second electrode 5b of the second connector 3b since the switch 8 is turned off when the first module 2a is attached to the second connector 3b disposed at the N+1 column.

The expansion unit 13 of the second module 2b is electrically connected to the second electrode 5b of the second connector 3b when the second module 2b is attached to the second connector 3b. According to operation, the fourth embodiment prevents the second module 2b from being connected to the first connector 3a. That is, it is possible to carry out data transmission between the control unit 12 and the expansion unit 13 only when the first module 2a is attached to the first connector 3a while the second module 2b is attached to the second connector 3b. This makes it possible for the control unit 12 to control the expansion unit 13. That is, the expansion unit 13 expands the communication function of the first module 2a, thus allowing a combination of the first and second modules 2a, 2b to operate as a single server.

In the computer 401 of the fourth embodiment shown in FIGS. 7 and 8, the first and second connectors 3a, 3b include third electrodes 5c connected to a network (Net) such as a LAN (Local Area Network). Herein, the third electrode 5c of the first connector 3a is disposed at the same position as the third electrode 5c of the second connector 3b.

The first and second modules 2a, 2b include electrodes 7c electrically connectable to the third electrodes 5c even when both the first and second modules 2a, 2b are attached to the first connectors 3a or the second connectors 3b. That is, the first module 2a can operate independently even when the first module 2a is attached to either the first connector 3a or the second connector 3b.

Additionally, the first connector 3a includes a fourth electrode 5d and a clamp C while the first module 2a includes an electrode 7d. The electrode 7d of the first module 2a is electrically connected to the fourth electrode 5d of the first connector 3a when the first module 2a is attached to the first connector 3a. The electrode 7d is connected to the switch 8 in the first connector 3a. The switch 8 is turned on with a predetermined fixed potential applied thereto.

The clamp C is connected to the fourth electrode 5d in the first connector 3a. For example, the clamp C produces a predetermined fixed potential (H) sufficiently higher than the reference potential when the first connector 3a is supplied with power from an external device (not shown). The fixed potential is applied to the fourth electrode 5d.

Similar to the first connector 3a, the second connector 3b includes a fourth electrode 5d. For example, the fourth electrode 5d of the second connector 3b is connected to a signal ground (SG) and held at a reference potential (L). That is, the electrode 7d is set to the reference potential when the first module 2a is attached to the second connector 3b as shown in FIG. 8. This makes it possible to reliably turn off the switch 8 of the first module 2a. In other words, it is possible to discriminate the type of the connector 3 with the switch 8 of the first module 2a based on the potential of the fourth electrode 5d. In this connection, the fourth electrode 5d serves as an identification device.

Owing to the switch 8 serving as a normally-open-type switch, as shown in FIG. 8, the fourth electrode 5d of the first connector 3a is set to the fixed potential (H) while the fourth electrode 5d of the second connector 3b is set to the reference potential (L); but this is not a restriction. For example, it is possible to set the reference potential to the first connector 3a while setting the fixed potential to the second connector 3b by use of the switch 8 serving as a normally-closed-type switch, and therefore the fourth electrode 5d of the first connector 3a is set to the reference potential (L) while the fourth electrode 5d of the second connector 3b is set to the fixed potential (H). Thus, it is possible to automatically turn off the switch 8 via the fourth electrode 5d of the second connector 3b when the first module 2a is attached to the second connector 3b.

Figure 9:
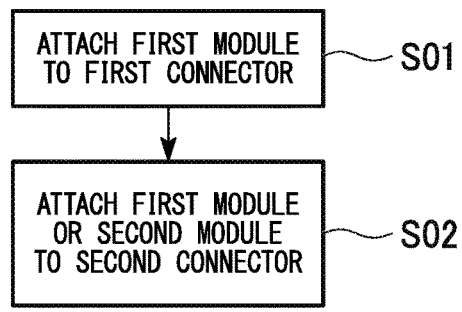
FIG. 9 is a flowchart showing an assembling method of the computer of the fourth embodiment.

Next, an assembling method of the computer 401 of the fourth embodiment will be described with reference to FIG. 9. FIG. 9 is a flowchart showing an assembling method of the computer 401 of the fourth embodiment. First, the first module 2a is attached to the first connector 3a in step S01. Next, either the first module 2a or the second module 2b is attached to the second connector 3b in step S02.

In FIG. 8, in which the switch 8 is turned on when a pair of first modules 2a is attached to a pair of first and second connectors 3a, 3b, the control unit 12 of the first module 2a attached to the first connector 3a is connected to the first electrode 5a of the first connector 3a while the control unit 12 of the first module 2a attached to the second connector 3b is not connected to the second electrode 5b of the second connector 3b since the switch 8 is turned off. In this case, the control units 12 cannot recognize each other through the data transmission line 4. That is, each of the first modules 2a attached to the first and second connectors 3a, 3b can operate as an independent server.

In FIG. 7, the switch 8 of the first module 2a is turned on when the first module 2a is attached to the first connector 3a while the second module 2b is attached to the second connector 3b. The expansion unit 13 is connected to the data transmission line 4 due to the absence of the switch 8 in the second module 2b. This makes it possible for the expansion unit 13 to carry out data transmission with the control unit 12. That is, it is possible for the control unit 12 to control the expansion unit 13. In other words, it is possible for the expansion unit 13 to expand the communication function of the first module 2a, and therefore a combination of the first and second modules 2a, 2b can operate as a single server.

It is possible to modify the fourth embodiment such that the first module 2a can recognize the second module 2b at the predetermined timing, and therefore the first module 2a attached to the first connector 3a can determine whether or not the second module 2b is attached to the second connector 3b. The fourth embodiment refers to one pair of first and second modules 2a, 2b, but it is possible to align a plurality of connectors 3 on the substrate 10 as shown in FIG. 4.

Figure 10:
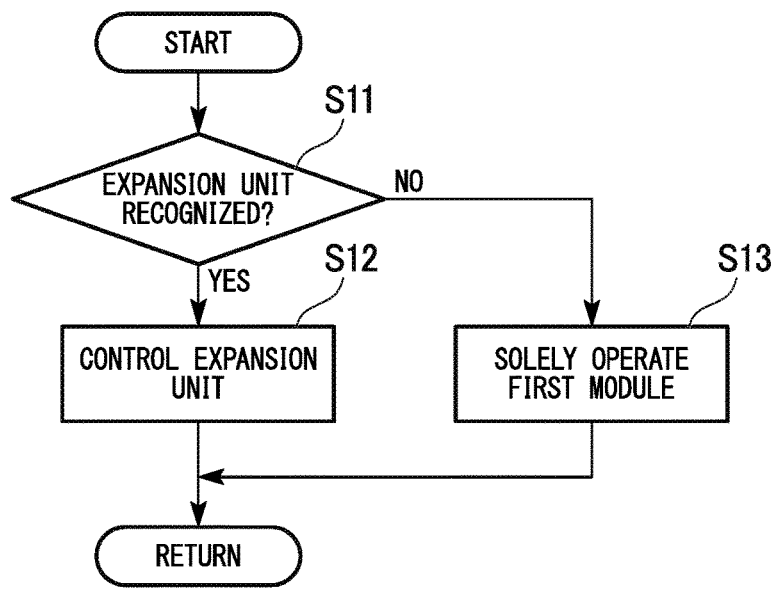
FIG. 10 is a flowchart showing an opening control process executed by the first module of the computer of the fourth embodiment.

Next, an opening control process configured to automatically open the data transmission line 4 with the first module 2a installed in the computer 401 of the fourth embodiment will be described with reference to FIG. 10. FIG. 10 is a flowchart showing the opening control process executed by the first module 2a of the computer 401 of the fourth embodiment.

First, the first module 2a is attached to the first connector 3a. The first module 2a is supplied with power by the first connector 3a. Thus, the control unit 12 of the first module 2a determines whether or not to recognize the second module 2b through the data transmission line 4. Specifically, the control unit 12 determines whether or not to recognize the expansion unit 13 of the second module 2b (step S11; a determination process). When the determination result shows that the control unit 12 of the first module 2a recognizes the expansion unit 13 of the second module 2b (i.e. "YES" in step S1), the first module 2a starts to control interactive communication with the second module 2b, and therefore the control unit 12 starts to control the expansion unit 13 (step S12; an expansion control process). When the determination result shows that the control unit 12 of the first module 2a does not recognize the expansion unit 13 of the second module 2b (i.e. "NO" in step S11), the first module 2a starts to solely operate as an independent server without expanding any function (step S13; an independent operation process).

Therefore, the fourth embodiment does not have the necessity of arranging a specific connector dedicated to the second module 2b configured to expand the server function of the first module 2a. It is possible to expand the server function of the first module 2a such that the first module 2a is attached to the first connector 3a disposed at the N column while the second module 2b is attached to the second connector 3b, adjoining the first connector 3a in the first direction D1, disposed at the N+1 column. Thus, it is possible to flexibly and easily expand the server function according to a client's specification.

Additionally, it is possible to attach the first module 2a to the first connector 3a disposed at the N column while attaching the other first module 2a to the second connector 3b disposed at the N+1 column. In this case, it is possible for each of the first modules 2a attached to the first and second connectors 3a, 3b to operate as an independent server. As a result, it is possible to improve expandability in a high-density server. Additionally, it is possible to prevent complexity of design and increased cost in manufacturing servers.

Moreover, it is possible to assemble the computer 401 of the fourth embodiment according to a first configuration of FIG. 7 in which the second module 2b is attached to the second connector 3b or a second configuration of FIG. 8 in which the first module 2a is attached to the second connector 3b. That is, it is possible to selectively carry out a first operation of expanding the function of the first module 2a in the first configuration of FIG. 7 or a second operation of enabling an independent operation for each first module 2a without implementing any switching operation on the data transmission line 4. As a result, it is possible to prevent complexity in an assembling operation while alleviating the work load of an operator.

In the second configuration of FIG. 8 in which a pair of first modules 2a is attached to a pair of first and second connectors 3a, 3b, it is possible to independently start a server operation with each first module 2a without implementing any operation to start controlling interactive communication (using acknowledgement (Ack)). Thus, it is possible to rapidly start a server operation.

The present invention is not necessarily limited to the foregoing embodiments; hence, the present invention embraces any variation applicable to the foregoing embodiments without departing from the subject matter of the invention. That is, the foregoing shapes and configurations are illustrative but not restrictive; hence, it is possible to modify the foregoing embodiment in various manners.

In the fourth embodiment, for example, the first electrode 5a of the first connector 3a in the longitudinal direction is located at a different position than the second electrode 5b of the second connector 3b in the longitudinal direction; but this is not a restriction. That is, the first and second electrodes 5a, 5b do not necessarily differ from each other in terms of their positions in the longitudinal direction of the connectors 3.

Additionally, the first and second connectors 3a, 3b are not necessarily limited in shape in the foregoing embodiments. The fourth embodiment refers to the second module 2b having the expansion unit 13 configured to expand the communication function (LAN); but this is not a restriction. That is, each server is not necessarily expanded in terms of the communication function.

The foregoing embodiments refers to the switch 8 installed in the first module 2a; but this is not a restriction. For example, it is possible to arrange the switch 8 close to the connector 3; that is, it is possible to install the switch 8 in either the first connector 3a or the second connector 3b.

The fourth embodiment refers to the switch 8 which is turned on based on the fixed potential of the clamp C installed in the first connector 3a; but this is not a restriction. For example, it is possible for the control unit (CPU) 12 to control ON/OFF of the switch 8. In the second configuration of FIG. 8 in which a pair of first modules 2a is attached to a pair of first and second connectors 3a, 3b, it is possible to turn off at least one of the first modules 2a attached to the first and second connectors 3a, 3b connected together through the data transmission line 4 when the control unit 12 of the first module 2a attached to the second connector 3b refers to a register (not shown) of the control unit 12 of the first module 2a attached to the first connector 3a.

It is possible to produce and store programs, representing the operation of the first module 2a, in a computer-readable storage medium D (see FIGS. 7 and 8), and therefore the computer system of the control unit 12 of the first module 2a loads and executes programs to implement the processes of the foregoing embodiments. Herein, the term "computer system" may embrace software such as an operating system (OS) and hardware such as peripheral devices. Additionally, the term "computer system" using the world-wide-web (WWW) system may embrace homepage providing/displaying environments. Moreover, the term "computer-readable storage media" may embrace magnetic disks, magneto-optic disks, CD-ROM, DVD-ROM, semiconductor memory etc. In this connection, it is possible to deliver programs to a computer system through communication lines, and therefore the computer system may execute programs.

The above programs may implement part of the foregoing functions. Alternatively, the above programs may represent differential files (or differential programs) which can be combined with pre-installed programs of the computer system so as to implement the foregoing functions.

Lastly, the present invention is not necessarily limited to the foregoing embodiments, but can be further modified within the scope of the invention defined by the appended claims.

The invention claimed is:

1. A computer, comprising:
a first module including a first internal circuit and a switch;
a second module including a second internal circuit to be controlled by the first module;
a first connector, which is applied a first potential and only connectible to the first module via the switch;
a second connector, which is applied a second potential and connectible to either the first module or the second module; and
a data transmission line configured to connect the first connector to the second connector,
wherein the switch establishes an electric connection only when the first module is connected to the first connector, such that the first module controls the second module connected to the second connector through the data transmission line,
wherein the switch breaks the electric connection when the first module is connected to the second connector, and
wherein the first potential is higher than the second potential when the switch is a normally-open-type switch while the first potential is lower than the second potential when the switch is a normally-closed-type switch.

2. A computer, comprising:
a plurality of first modules each including a first internal circuit and a switch;
a plurality of second modules each including a second internal circuit to be controlled by each of the plurality of first modules;
a plurality of first connectors, which are each applied a first potential and only connectible to the plurality of first modules;
a plurality of second connectors, which are each applied a second potential and connectible to either the plurality of first modules or the plurality of second modules; and
a plurality of data transmission lines configured to connect the plurality of first connectors to the plurality of second connectors,
wherein the plurality of first connectors and the plurality of second connectors are alternatively aligned in a matrix defined by first and second directions perpendicular to each other,
wherein the switch establishes an electric connection only when each of the plurality of first modules is connected to each of the plurality of first connectors, such that each of the plurality of first modules controls each of the plurality of second modules connected to each of the plurality of second connectors through each of the plurality of the data transmission lines, and
wherein the switch breaks the electric connection when each of the plurality of first modules is connected to each of the plurality of second connectors.

3. A connector set detachably connectible to a first module including a first internal circuit and a switching mechanism and a second module including a second internal circuit to be controlled by the first module, comprising;
a first connector, which is applied a first potential and only connectible to the first module via the switching mechanism;
a second connector, which is applied a second potential and connectible to either the first module or the second module; and
a data transmission line configured to connect the first connector to the second connector, wherein the switching mechanism establishes an electric connection only when the first module is connected to the first connector, such that the first module controls the second module connected to the second connector through the data transmission line,
wherein the switch breaks the electric connection when the first module is connected to the second connector, and
wherein the first potential is higher than the second potential when the switching mechanism is a normally-open-type switch while the first potential is lower than the second potential when the switching mechanism is a normally-closed-type switch.

* * * * *